Oct. 22, 1946.   J. B. WHITMORE ET AL   2,409,725
AUTOMATIC MOLDING OF PLASTICS
Filed April 4, 1941   9 Sheets-Sheet 1

INVENTORS
J. B. WHITMORE
W. MAKENNY
F. A. NEWCOMBE
BY J.W. Greenhouse
ATTORNEY

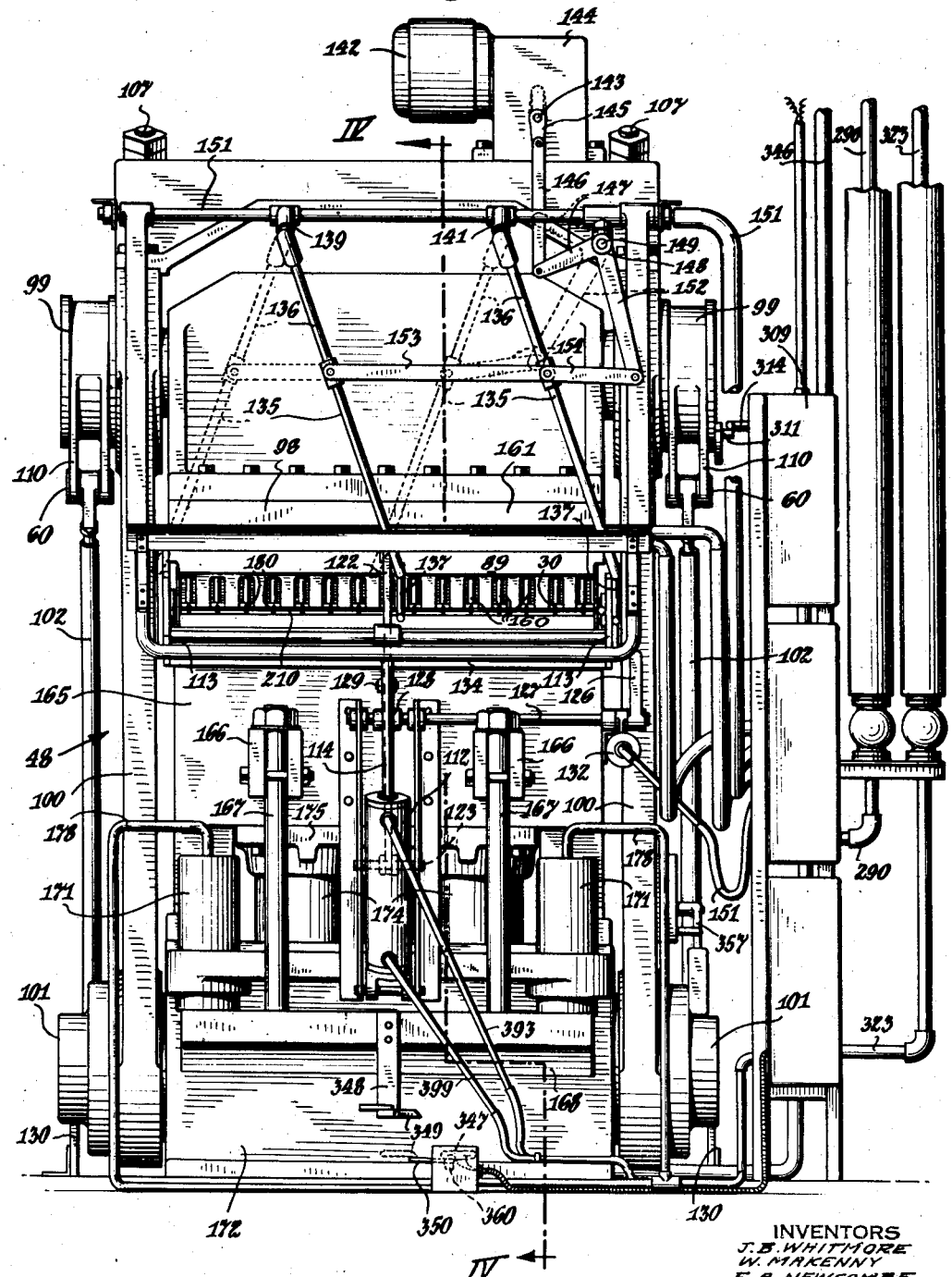

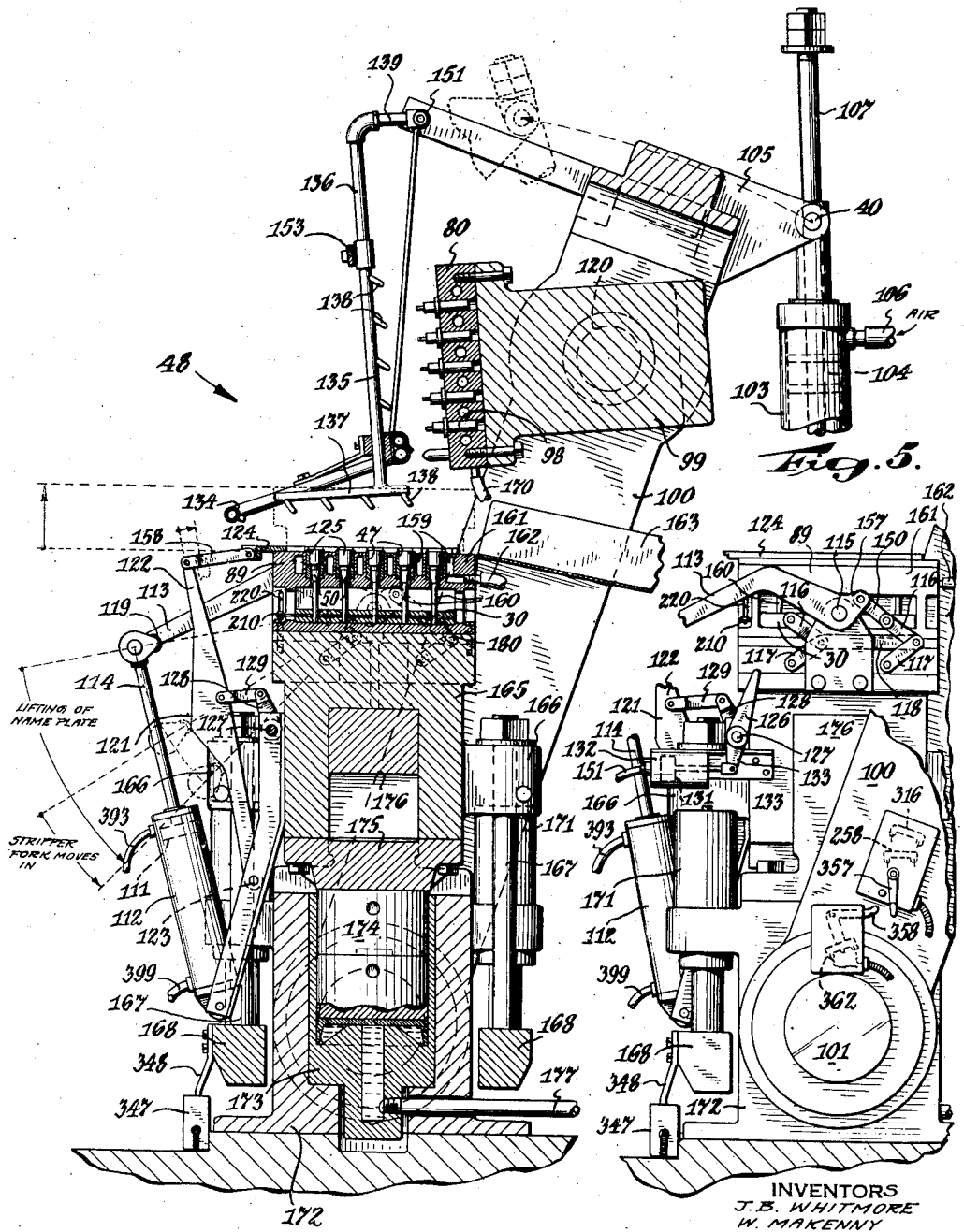

Oct. 22, 1946.  J. B. WHITMORE ET AL  2,409,725
AUTOMATIC MOLDING OF PLASTICS
Filed April 4, 1941  9 Sheets-Sheet 4
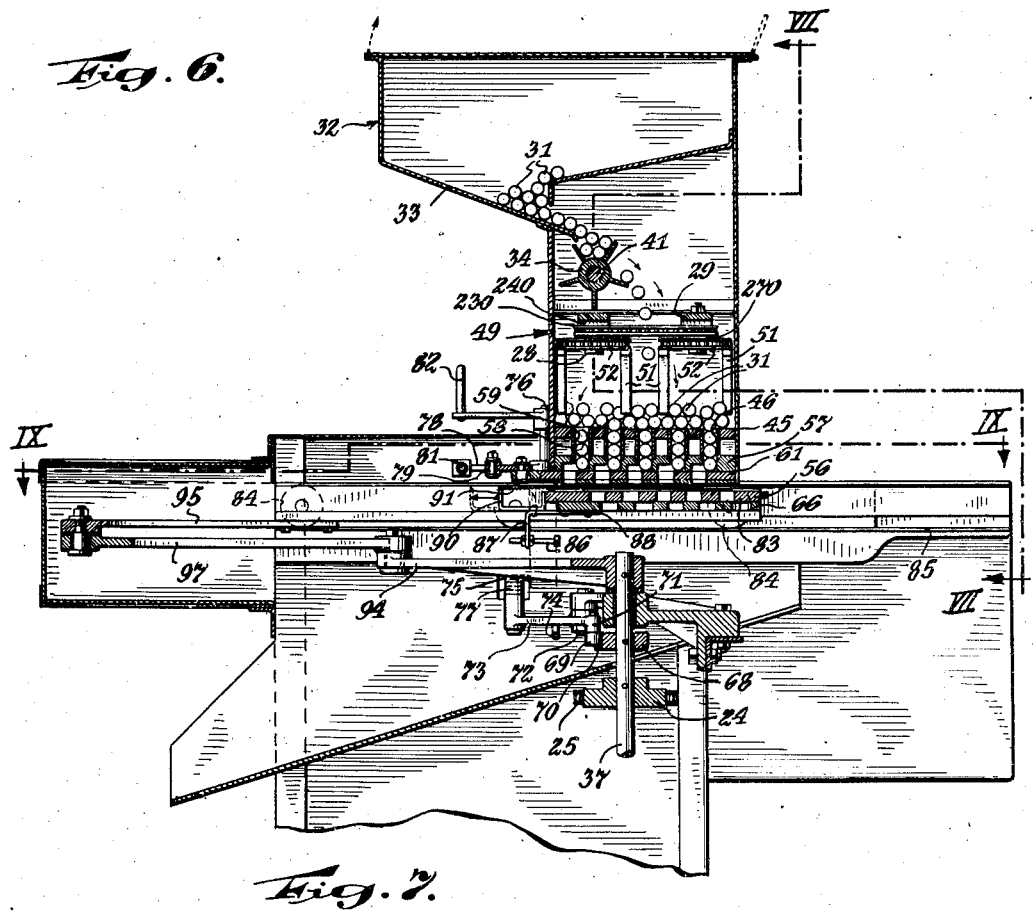
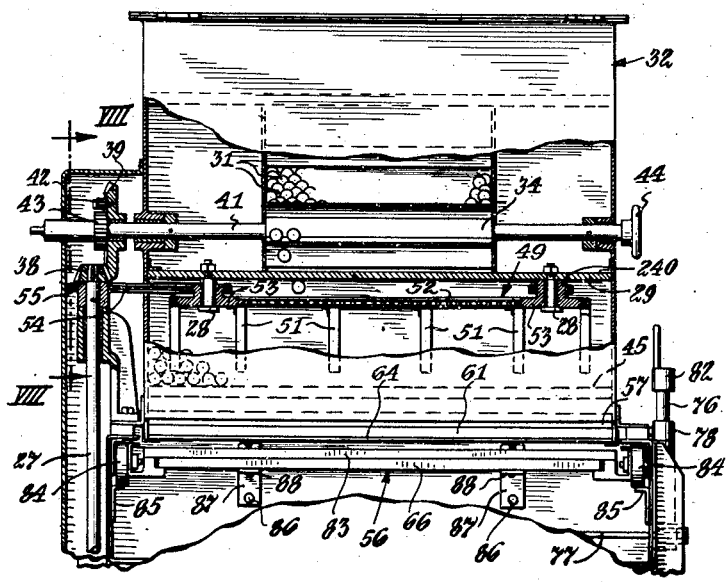
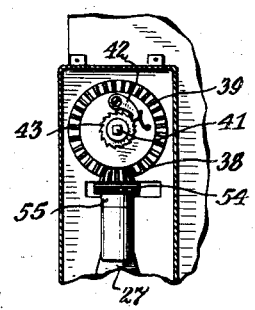
INVENTORS
J. B. WHITMORE
W. MAKENNY
F. A. NEWCOMBE
BY
ATTORNEY Oct. 22, 1946.   J. B. WHITMORE ET AL   2,409,725
AUTOMATIC MOLDING OF PLASTICS
Filed April 4, 1941   9 Sheets-Sheet 5

INVENTORS
J. B. WHITMORE
W. MAKENNY
F. A. NEWCOMBE
BY
ATTORNEY

INVENTORS
J. B. WHITMORE
W. MAKENNY
BY F. A. NEWCOMBE
ATTORNEY

Oct. 22, 1946.    J. B. WHITMORE ET AL    2,409,725
AUTOMATIC MOLDING OF PLASTICS
Filed April 4, 1941    9 Sheets-Sheet 7
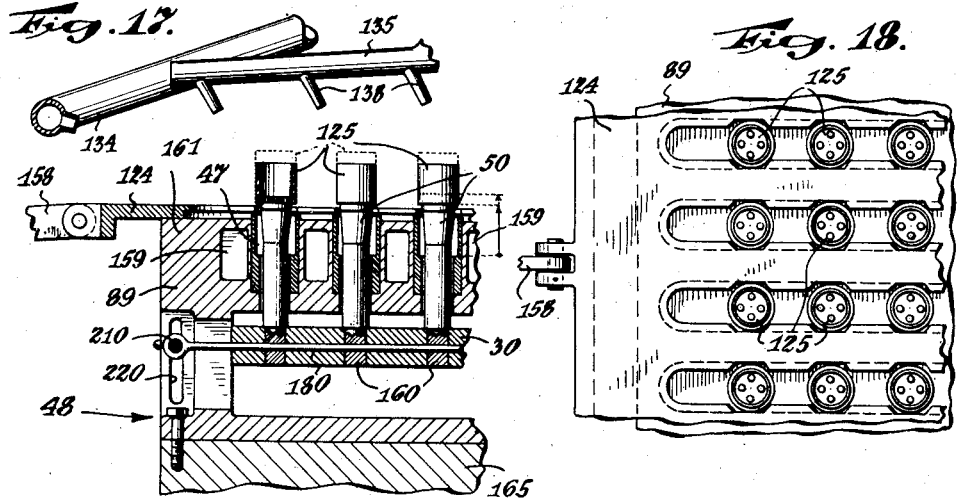
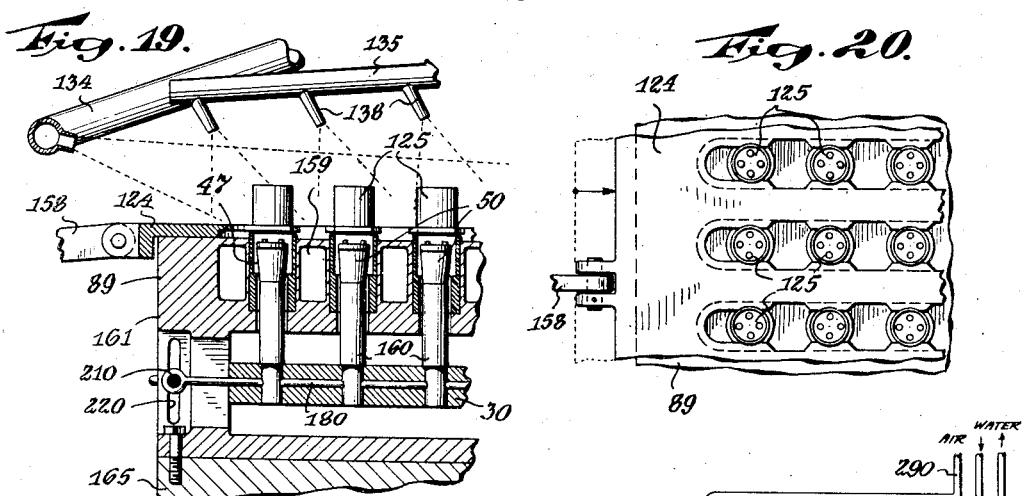
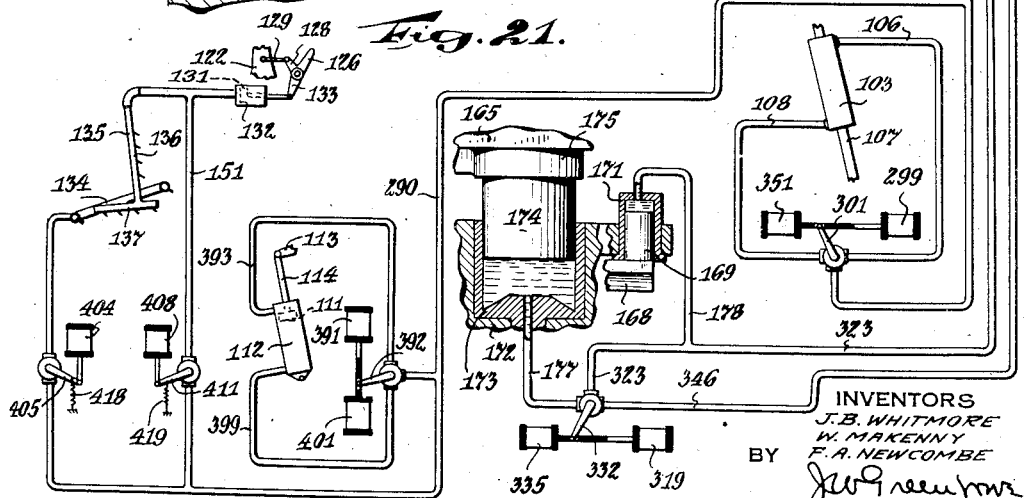
INVENTORS
J. B. WHITMORE
W. MAKENNY
F. A. NEWCOMBE
BY
ATTORNEY

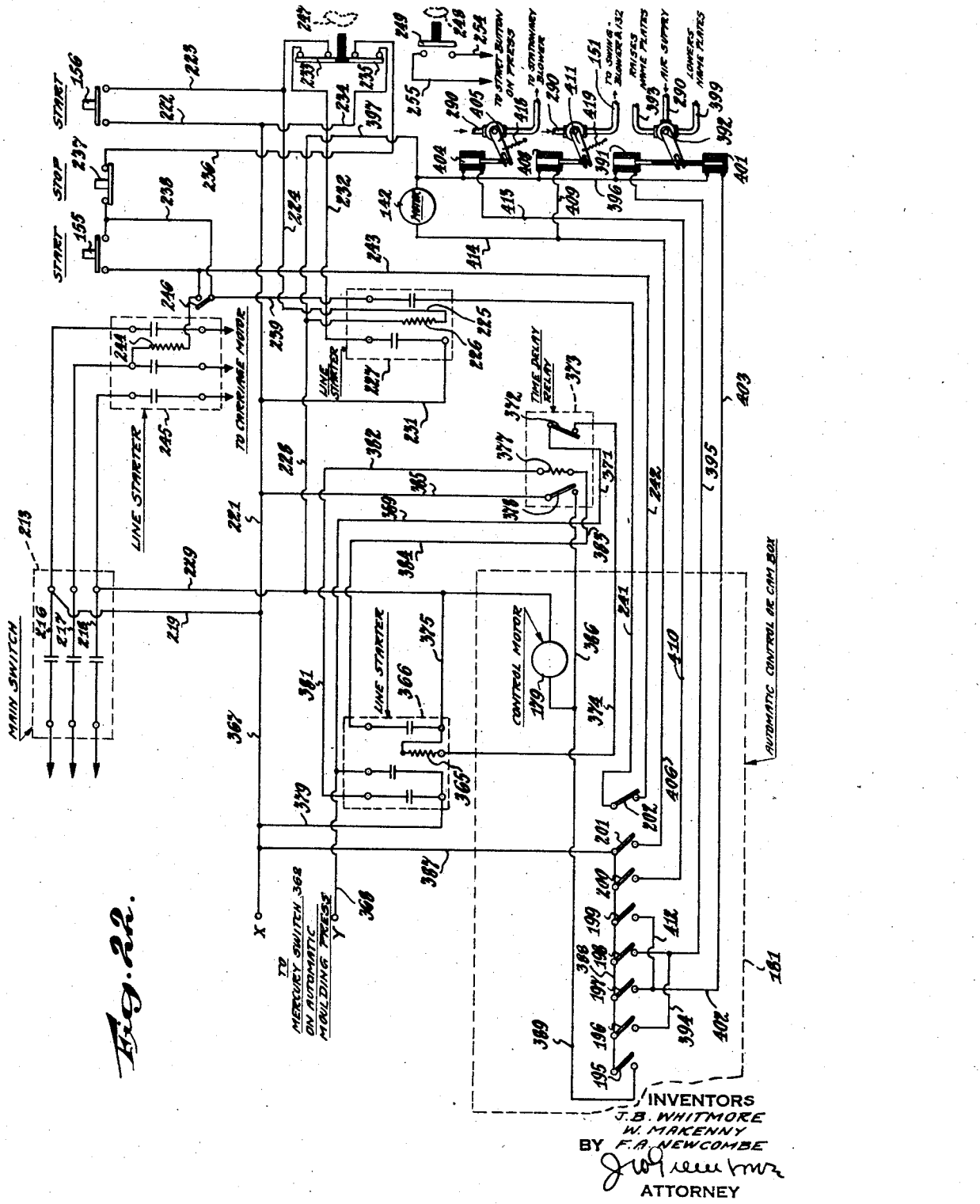

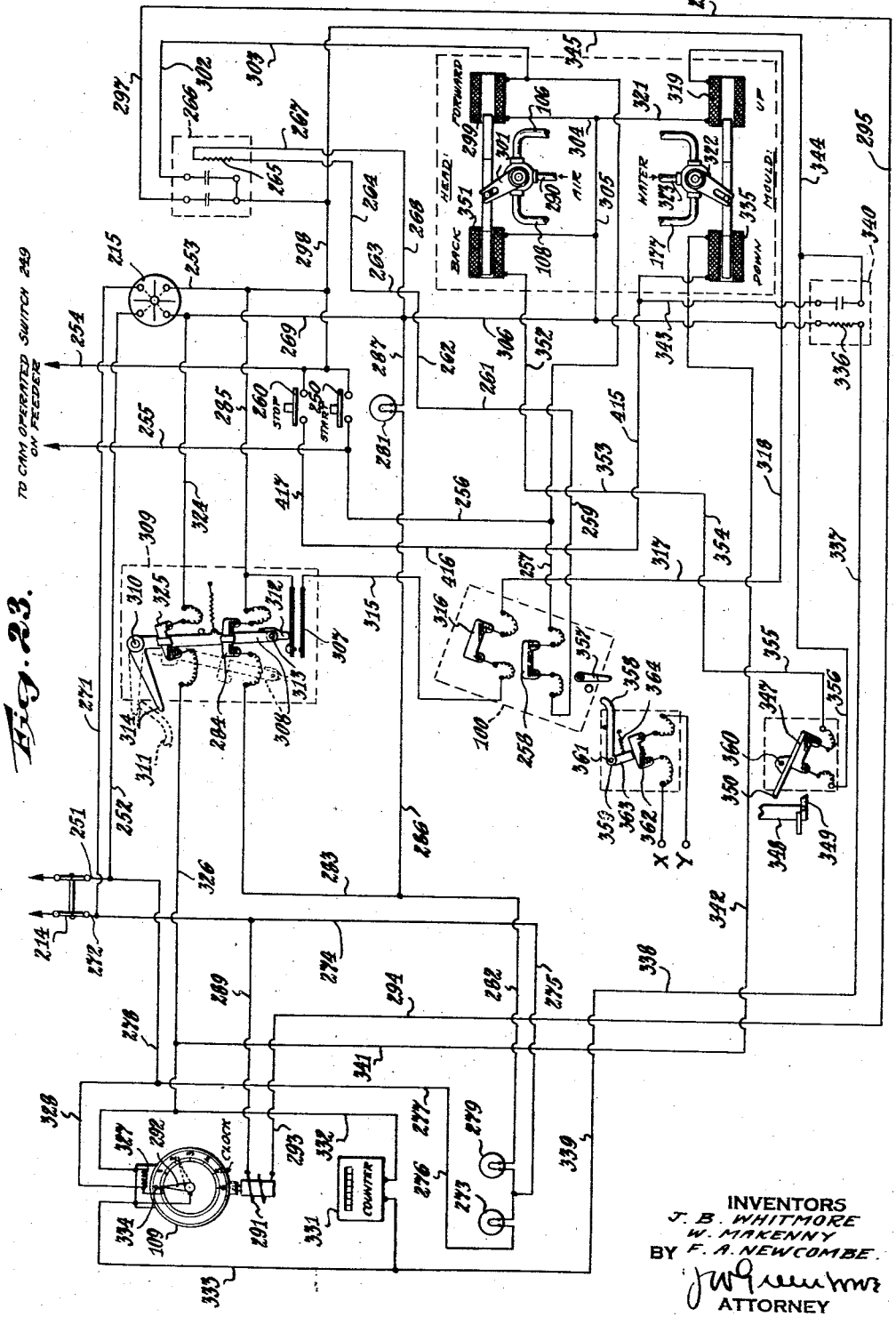

Patented Oct. 22, 1946

2,409,725

UNITED STATES PATENT OFFICE 2,409,725

AUTOMATIC MOLDING OF PLASTICS

James B. Whitmore, Bloomfield, William Makenny, Mountain View, and Frank A. Newcombe, Nutley, N. J., assignors to Westinghouse Electric Corporation, East Pittsburgh, Pa., a corporation of Pennsylvania Application April 4, 1941, Serial No. 386,790

8 Claims. (Cl. 18—16)

This invention relates to the automatic molding of plastics, and more particularly to means for automatically loading a molding press with the plastic material in the form of tablets or pellets, operating the press to form the material, and then unloading the articles formed.

The principal object of our invention, generally considered is to make entirely automatic the operation of molding plastic materials, where high temperatures and pressures are important, to form articles such as radio tube bases, whereby pellets or tablets of plastic material may be fed to a hopper at one side of a machine and automatically delivered therefrom at the other side.

Another object of our invention is the provision of a hopper which receives tablets or pellets of plastic material and automatically delivers one of said pellets to each of pockets provided in a loading board.

A further object of our invention is the provision of a loading board which receives tablets or pellets of plastic material from a feed hopper and automatically places one of said pellets in each mold element of an automatic molding machine, and then passes back to said hopper for recharging.

A still further object of our invention is the provision of means for automatically raising the name plates in the bottoms of mold elements of an automatic molding machine, in order to lift the molded articles therefrom, simultaneously move a stripper fork beneath said molded articles, and then blow the latter to a discharge trough for removal from the machine.

An additional object of our invention is the provision for automatically cleaning the mold elements, or removing what is called "flash" therefrom, after each charge of articles molded therein has been removed.

Other objects and advantages of the invention, relating to the particular arrangement and construction of the various parts, will become apparent as the description proceeds.

Referring to the drawings illustrating our invention:

Figure 3 is a front elevational view of the molding press, or right hand part of the apparatus, on the line III—III of Figure 1, in the direction of the arrows.

Figure 4 is a vertical sectional view on the line IV—IV of Figure 3, in the direction of the arrows, but showing the press in the open position.

Figure 5 is a fragmentary elevational view of the lower portion of the press shown in Figure 4, in the same direction as the arrows on the line IV—IV of Figure 3.

Figure 6 is a longitudinal sectional view of the pellet feeding hopper and associated mechanism, on the line VI—VI of Figure 9 in the direction of the arrows.

Figure 7 is a partial end elevational view and partial vertical sectional view on the line VII—VII of Figure 6, in the direction of the arrows.

Figure 8 is a fragmentary vertical sectional view on the line VIII—VIII of Figure 7, in the direction of the arrows.

Figure 17 is a view of the lower mold elements of the press, as illustrated in Figure 16, but showing portions of the air lines and the positions of the parts after the loading board has been withdrawn and the name plates or lower portions of said mold elements raised to remove the molded articles, but before the stripper fork has moved inwardly therebeneath.

Figure 18 is a fragmentary plan of the portion of the stripper fork and lower mold elements as shown in Figure 17.

Figure 19 is a view corresponding to Figure 17, but showing the positions of the parts when the name plates have been lowered, after the stripper fork has moved beneath the molded articles, leaving the latter resting thereon in line with blasts of air from nozzles for removing to a discharge chute.

Figure 20 is a fragmentary plan of the portion of the stripper fork and lower mold elements as shown in Figure 19.

Figure 21 is a piping diagram for the air and hydraulic press mechanism.

Figure 22 is a wiring diagram for the feeder mechanism and cam-operated switches, and Figure 23 is a wiring diagram for the molding press and timer.

The Makenny et al. Patent No. 2,197,528, dated April 16, 1940, discloses a molding press which is automatic, in the sense that after loading with plastic material it will, upon the mere pushing of a button, mold the material for a predetermined length of time and then automatically open to permit the removal of the molded articles. Radio base shells and similar articles may be molded from powdered plastic material, such as "Bakelite." One workman can operate two of these presses, producing about 22 units of work from each press per hour. By unit we mean the capacity of a set of molds on a press, which may be fifty-two or seventy-five molded parts.

Our problem was to increase the number of parts that could be molded by one workman. The only way to do this was to decrease the manual work required per unit of output.

The equipment which we use in the performance of the operation is an automatic loader and unloader and means for cleaning the press with a minimum amount of labor, whereby one workman can operate several presses and thus reduce the man hours per press. The equipment, involving a preferred embodiment of our invention, comprises generally:

1. A structural supporting frame work.
2. A hopper for tablets or pellets of plastic material, with means to feed therefrom at one time a relatively large number, such as seventy-five, to a press loading board.
3. Means for automatically moving the loading board from beneath the hopper to the molding press, discharging the contents of said board into said press, and returning the board to a position beneath the loading hopper for recharging.
4. Means for closing the loaded press to mold the desired articles and then opening it at the end of a predetermined cycle and raising the molded articles.
5. Means for discharging the molded articles from the press.
6. Means for cleaning the molds of excess material known as "flash".
7. Control equipment to operate all of the above in proper sequence upon the mere pressing of a single starting button.

Figure 15:
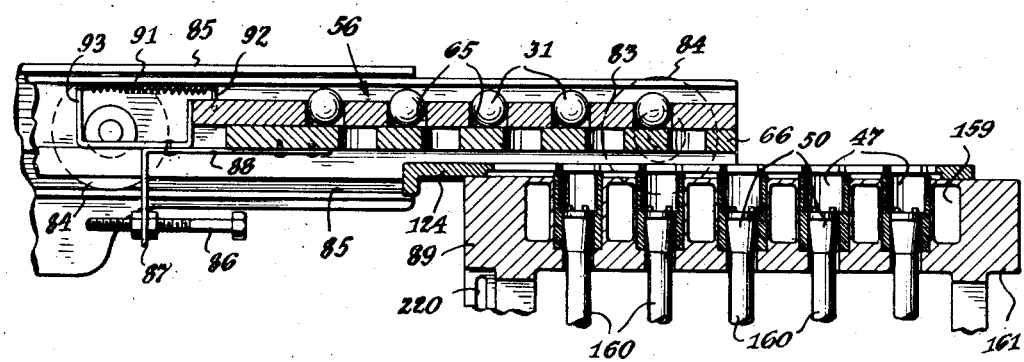
Figure 15 is an enlarged fragmentary vertical sectional view, corresponding to Figure 4, but illustrating the loading board on its way to a position above the lower mold elements of the press.

The cycle-control mechanism employed operates motors, solenoid air valves, and switches at the proper time to cause the machine to function properly. Broadly speaking, the functions performed by the disclosed embodiment of our invention are as follows:

1. Assuming the loading hopper contains a supply of pellets or tablets of plastic material, these pellets are fed, a few at a time, to distributor plates in the bottom of said hopper, as illustrated generally in Figure 6.
2. A charge of pellets is delivered through said distributor plates to a loading board carried on wheels, while the same is disposed beneath said hopper, as illustrated most clearly in Figures 12 and 13.
3. The loading board is moved from beneath the loading hopper to above the lower mold elements of the molding press, as shown most clearly in Figure 15.
4. The pellets are dropped from the loading board into the lower mold elements of the press, as shown most clearly in Figure 16.
5. The loading board is moved back to recharging position illustrated most clearly in Figures 6, 12 and 13.
6. The upper head of the press, carrying the upper mold elements, swings forward from the position shown in Figure 4, to that over the lower mold elements, as shown most clearly in Figure 1, and returns after the molding operation.
7. The lower mold elements are raised to compress the pellets between the upper and lower mold elements, as shown most clearly in Figure 1, and lowered after the pressing operation.
8. The name plates in the bottoms of the lower mold elements rise and fall, as shown most clearly in Figures 17 to 20, inclusive.
9. The stripper fork is moved beneath the molded articles when lifted by the name plates, from the position shown in Figures 17 and 18, so that said articles rest thereon, as shown most clearly in Figures 19 and 20, when the name plates are lowered.
10. The shells, radio tube bases or other molded articles, are blown to the discharge chute by blasts of air, as represented most clearly in Figures 4 and 19.
11. The molds are cleaned of "flash" by blasts of air, as represented most clearly in Figures 4 and 19.

*Delivery of pellets from hopper*

Referring to the drawings in detail, like parts being designated by like reference characters, and beginning with the charging of generally spherical tablets or pellets 31 of plastic material, such as a phenolic condensation product or "Bakelite," into the hopper 32, as shown in Figure 6, we find that these pellets pass down an inclined wall 33 of said hopper on to a feeding wheel 34, which is turned by means of a carriage motor 35 (Fig. 1) through gears (not shown) in gear box 36, vertical shaft 37, sprocket wheel 24 thereon, drive chain 25, driven sprocket wheel 26 fixed on shaft 27 (Figs. 7 and 9), driving bevel gear 38 on said shaft, driven bevel gear 39, and feeding-wheel carrying-shaft 41.

The bevel gear 39 is adapted to drive shaft 41 through a spring-pressed pawl 42, pivoted to said gear, and ratchet 43 fixed on shaft (Fig. 8), so that if desired the feeding wheel 34 may be manually turned by shaft-carried hand wheel 44 (Fig. 7) independently of the carriage motor 35.

In the bottom of the hopper 32 is an upper distributor plate 45 (Figs. 6, 12 and 13) provided with apertures 46 therethrough, corresponding in number and arrangement with the lower mold elements 47 (Figs. 4, 15 and 16) of the press 48.

In order to distribute the pellets 31 uniformly to the apertures 46 of the distributor plate, we provide mechanism 49 for agitating or stirring said pellets around on the bottom of the hopper. This mechanism comprises fingers 51 depending from endless sprocket chains 52, carried by sprocket wheels 53, in turn driven by a sprocket chain 54 from a sprocket wheel 55 carried by the drive shaft 27 (Figs. 6 and 7). The sprocket wheels 53 are journalled on bearings 28 carried by hopper braces 29. The right hand sprocket chain 52, as viewed in Figure 6, is driven by cross chain 230 passing around pinion portions 240 and 270 of right and left wheels 53.

In order to aline several pellets vertically in position to be delivered to the press loading board 56, a lower distributor plate 57 is connected to the upper distributor plate 45 by means of tubes 58, one extending from each aperture 46 in the plate 45 to a corresponding aperture 59 in the plate 57.

To provide for feeding the pellets 31 one at a time from each aperture 59, there is provided a valve plate 61 slidable beneath the plate 57 and provided with a corresponding number of apertures 62 positioned so that said plate 61 may receive a pellet in each aperture and, upon movement thereof, transfer said pellets to apertures 63 in the delivery plate 64 of the hopper 32, and allow them to drop into corresponding pockets 65, in the loading board 56, normally closed by the lower apertured plate 66 of said loading board.

Figure 14:
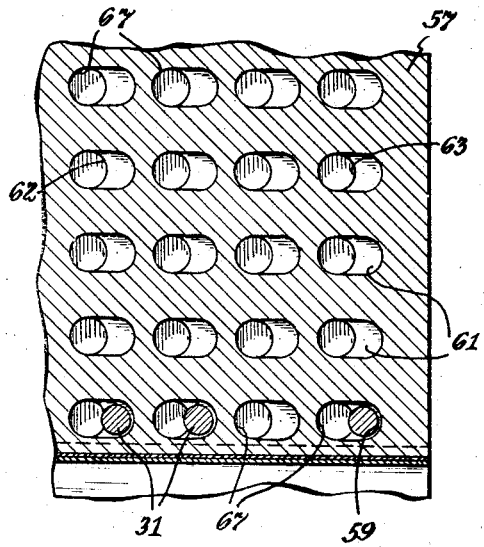
Figure 14 is a horizontal sectional view on the line XIV—XIV of Figure 13, in the direction of the arrows.
Figure 12:
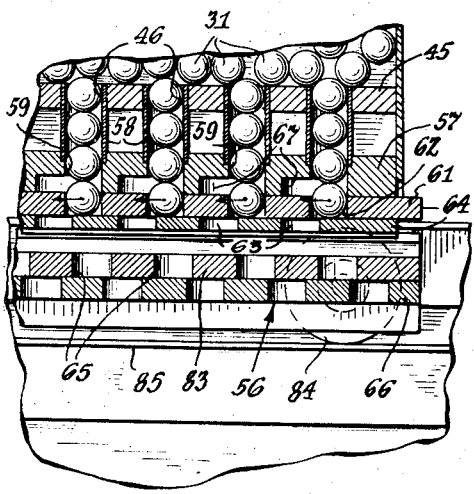
Figure 12 is an enlarged fragmentary vertical sectional view, corresponding to Figure 6, showing the positions of the parts with the loading hopper in the next position preparatory to charging the loading board.
Figure 13:
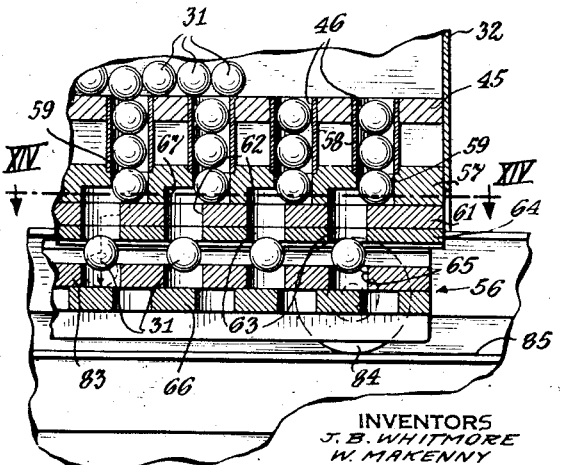
Figure 13 is a view corresponding to Figure 12, but showing the positions of the parts when the loading hopper valve has been moved to the next position to charge the loading board.

Inasmuch as the pellets 31 are, in the present embodiment, of larger diameter than the thickness of the valve plate 61, the lower distributor plate 57 has its apertures 59 formed with lower extensions 67, as shown most clearly in Figures 12, 13, and 14, so that upon movement of the valve plate 61 to the left, from the normal position shown in Figure 13 to that shown in Figure 12, and then back again, the tops of the pellets 31, which drop down on the delivery plate 64, pass into said extensions 67, and upon registry of the apertures 62 and 63, one pellet is dropped through each aperture 63 and received in a then-aligned pocket 65 of the loading board 56, as shown most clearly in Figure 13.

Figure 9:
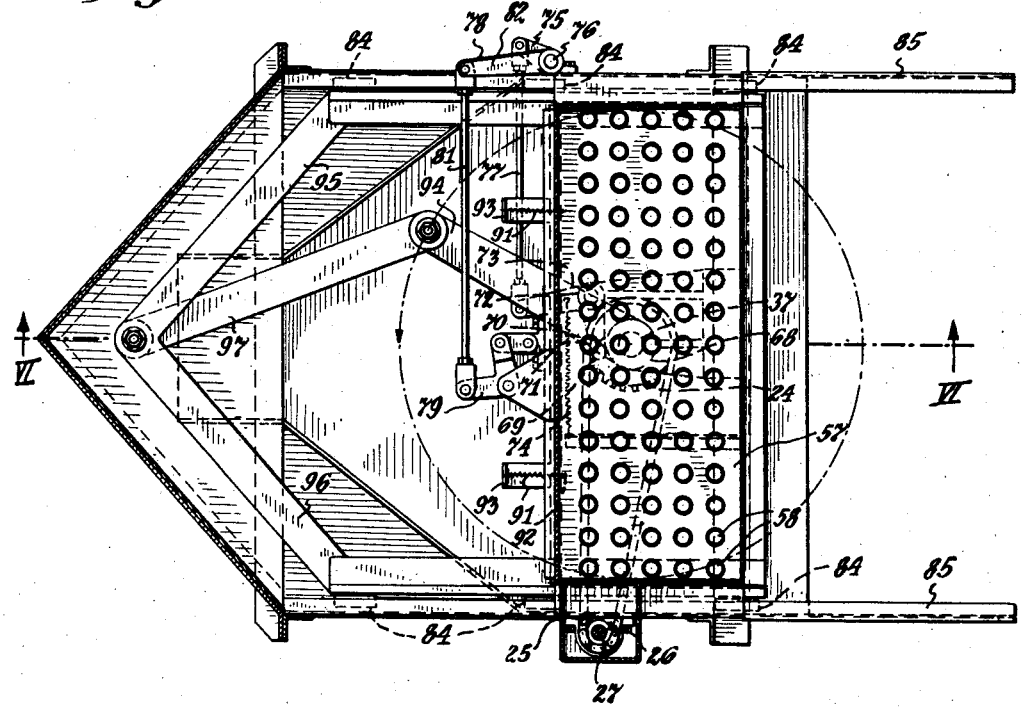
Figure 9 is a horizontal sectional view on the line IX—IX of Figure 6, in th e direction of the arrows.

The valve plate 61 is moved at the proper times, for feeding the pellets therethrough, by means of cam wheel 68 fixed on shaft 37 and on which travels a roller 69. The cam wheel 68 has a projection 70, which moves the roller-carrying arm 71 of a bell crank lever 72 once each revolution, to cause corresponding movement of the other arm 73 of said lever against the action of return spring 74 (Figs. 6 and 9). This movement effects a corresponding motion of arm 75 fixed on shaft 76, through connecting rod 77. Movement of the shaft 76 effects corresponding motion of the arm 78 fixed thereon, which, in turn, operates a bell crank lever 79, through connecting rod 81, thereby effecting movement of the valve plate 61 from the normal position shown in Figure 13 to that shown in Figure 12, and a prompt spring return to the normal position. This action transports a set of pellets 31 from the position shown in Figure 12 to that shown in Figure 13, where they are received in pockets 65 in the loading board 56. In order to allow for such an operation being performed by hand, the shaft 76 is extended upwardly, as shown most clearly in Figure 6, and provided with a hand operable lever 82.

The loading board 56 consists of a lower apertured plate 66, carried by an upper apertured plate 83, mounted on wheels 84. These wheels travel on rails 85 from beneath the hopper 32 to above the lower mold elements 47 of the press 48. The lower plate 66 is adapted to slide beneath the upper plate 83, from the position shown in Figure 15, so as to release the pellets 31 carried by said loading board 56 when the latter reaches the position shown in Figure 16. This action is accomplished by means of bolts 86, adjustably mounted on the downwardly projecting flange 87 of an angle iron 88 carried by the plate 66, when the head of said bolt engages the lower mold frame 89, upon movement of the loading board 56 to its extreme right hand position (Figure 16), against the action of the return spring 91 which normally holds the plates 66 and 83 in the position illustrated in Figure 15. The spring 91 acts between a pin 92 projecting from the upper plate 83 and a flange 93 of an angular member 90 connected to the angle iron 88.

Transfer of the loading board 56 from beneath the hopper 32 to above the lower mold elements 47 is effected by the crank arm 94 (Figures 6 and 9) on shaft 37 and rotating therewith to cause, through connecting rod 97 pivoted to its free end, the desired reciprocation of said loading board by the rod connection with frame members 95 and 96 extending from opposite sides of said board.

Swinging of press head

Figure 1:
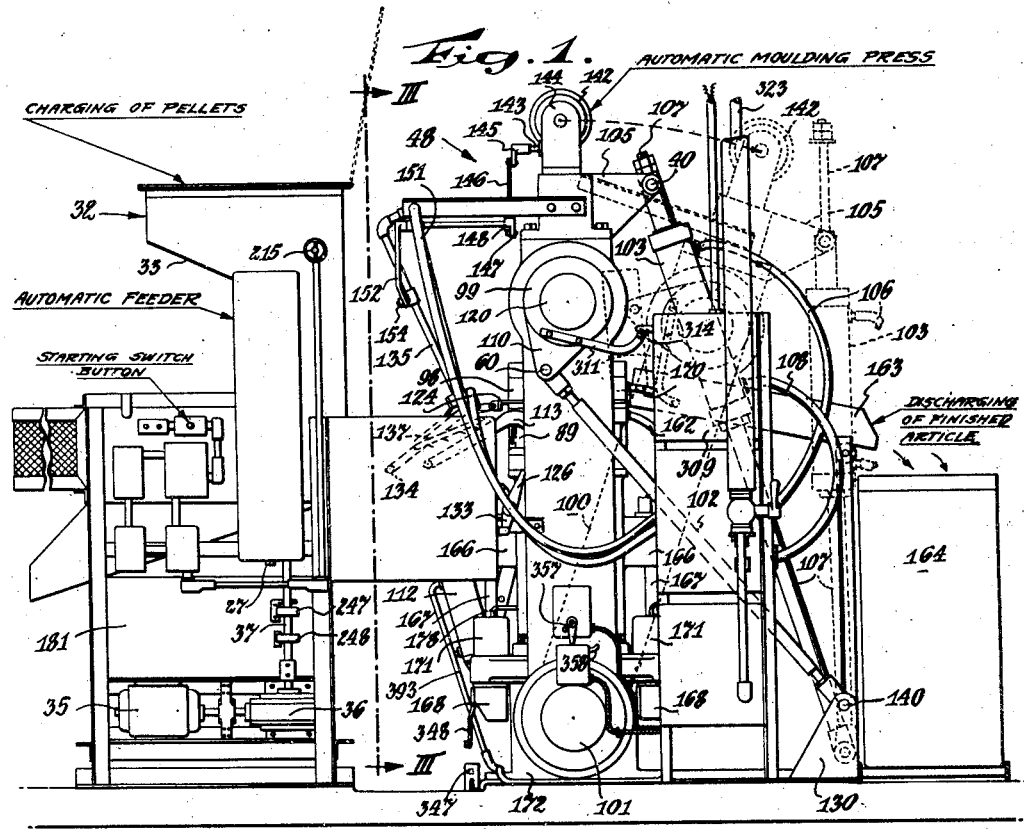
Figure 1 is a side elevational view of a complete machine embodying our invention, with the press in closed position.
Figure 16:
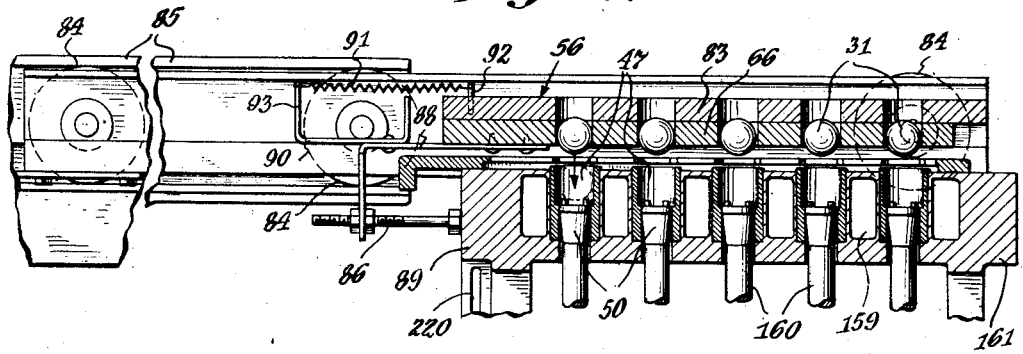
Figure 16 is a view corresponding to Figure 15, but showing the loading board as it is depositing pellets of plastic material in said lower mold elements.

Upon the pellets 31 being dropped into the lower mold elements 47, as indicated in Figure 16, the loading board 56 is moved back to recharging position, illustrated in Figures 6, 12 and 13, and the upper mold elements 98 of the press 48 are moved from their rearward or retracted position, indicated in full lines in Figure 4, to their forward or operative position indicated in full lines in Figure 1, by the following mechanism.

Said upper mold elements 98 are mounted in a hollow mold block or plate 80, heated by steam from pipe 170, and bolted or otherwise secured to a tilting head 99, which is mounted to swing, on connecting side plates 100, about trunnions 101 and, at the same time, be tilted with respect to said plates on trunnions 120 by means of rods 102 (Figures 1, 3, 4 and 5). The upper ends of said rods 102 are pivoted each to an extension or crank 110 on a trunnion 120 of the tilting head 99, as indicated at 60, and the lower end of which is pivoted to a bracket 130, as indicated at 140. Movement of the side plates 100 is effected by means of an air cylinder 103, pivoted to a bracket 105 secured thereon, as indicated at 40. Said cylinder is carried on a piston 104 and associated rod 107 and is moved from near one end to near the other of said rod by air pressure. Pipe 106 supplies compressed air to the upper portion of the cylinder 103 to move the same upwardly along the piston rod 107, swinging the pivoted side plates 100 from tilted position shown in Figure 4 to upright position shown in Figure 1. A return of the pivoted plates 100 is effected by compressed air through pipe 108, which acts under the piston 104 and moves the cylinder back to the position shown in Figure 4.

Operation of lower mold elements

When the upper mold elements 98 are positioned directly over the lower mold elements 47, as shown in Figure 1, said lower mold elements are raised from the position shown in full lines to that shown in dotted lines in Figure 4, to shape the pellets of plastic material between the upper and lower mold elements for a definite period determined by the timing clock 109 (Figure 23), while the lower mold elements are heated by steam introduced into the interior passages 159 of the lower mold block 161 through pipe 162.

The lower mold block 161 is mounted on a ram 165 (Figures 4 and 21), carrying ears 166 to which extend studs 167 from cross members 168 which serve for lowering or returning said ram. Such return is effected by pistons 169 carried by said cross members and operating in cylinders 171 carried by the base casting 172 of the press.

The base casting 172 carries the lifting cylinder 173, for the lower mold elements, in which is adapted to reciprocate the lifting piston 174, on the upper portion 175 of which is mounted the ram 165. The lowermost and uppermost positions of the ram are determined by cross frame portion 176 of the base casting 172. Water or other liquid is admitted to the lifting cylinder 173 through supply pipe 177 and to the return cylinders 171 through the supply pipe 178.

When the said time interval has passed, the lower mold elements 47 are dropped again to the position shown in full lines in Figure 4, and the name plates 50, forming the lower portions of the lower mold elements 47 are lifted by means of piston 111 operating a cylinder 112, to lower the side levers 113 through piston rod 114 about pivots 115, and thereby actuate the parallel motion lifting mechanism, consisting of two sets of lifting links 116 and 117 and a connecting member 118, through links 150 pivoted to extensions 157 of the levers 113. The upper ends of the links 116 are directly pivoted to the plate 30 to which the name plate stems 160 are secured by rods 180 passing through apertures in their reduced lower end portions, after being dropped into position, as shown in Figures 4, 17 and 19. The securing rods 180 are locked in position, after assembly, by transverse rods 210 passing through outer eye portions thereof, and with their ends, in turn, received in slots 220 in the lower mold block 161.

As the name plates 50 are lifted upon downward movement of the piston 111, the roller 119 carried at the upper end of the piston rod 114 engages cam projection 121 on lever 122 pivoted to the frame at 123, and thereby moves the stripper fork 124, through a connecting pivoted link 158, from the position shown in Figures 17, 18, and in full lines in Figure 4, to that shown in Figures 19, 20, and in dotted lines in Figure 4, so as to underlie the molded articles 125 which have been lifted by the name plates 50.

In order to insure that the stripper fork is in outermost position when the side plates 100 are in vertical positions, a safety lever 126 is provided on a shaft 127, on which is also fixed an operating lever 128 connected to the lever 122 by a pivoted link 129, so that said lever 122, if not already in its outermost position, will be moved to that position when the tilting head 99 is moved to a position directly above the lower mold elements 47, by engagement of the adjacent side plate 100 therewith, thereby avoiding the possibility of spoiling the molds by effecting an engagement therebetween when the stripper fork 124 is in lifting position. The stripper fork is normally returned to its outer position by compressed air against a piston 131 movable in a cylinder 132 and acting through its rod on a bottom extension 133 of the safety lever 126.

*Removal of molded articles and mold cleaning*

After the molded members 125 have been raised and deposited on the stripper fork 124, in the position shown in Figures 19 and 20, they are removed from the molding machine along a discharge chute 163 to a receptacle 164, by a blast of air issuing from nozzles on stationary compressed air pipe 134. When this has been effected, and before the mold is again closed, it is cleaned of loose material, such as "flash," by blasts of compressed air from oscillating compressed air pipes 135. These pipes involve angularly disposed portions 136 and 137, carrying a plurality of nozzles 138 from which air is discharged directly on the upper and lower mold elements, while said pipes traverse said elements from side to side, or from the position illustrated in full lines to that illustrated in dotted lines in Figure 3. Admitting compressed air to the cleaning pipes 135 also causes air to actuate piston 131 in cylinder 132 (Figures 5 and 21) to withdraw the stripper fork 124, unless positively advanced by the name plate raising mechanism.

The swinging movement of the pipes 135 is effected about the pivot points 139 and 141 by a blast operating motor 142 which operates a shaft 143, through reduction gearing contained in box 144, to turn a crank 145 and raise and lower a connecting rod 146. The lower end of said rod 146 is pivoted to an arm 147 of a bell crank lever 148, pivoted in turn at 149 to the air supply pipe 151, and having a depending arm 152 respectively connected by links 153 and 154 to the portions 136 of the compressed air pipes 135 (Fig. 3). In this way all of the mold elements are cleaned of waste material, such as "flash," by blasts of air, and prepared for the reception of a new supply of moldable material.

The mechanism heretofore described is electrically operated automatically by means of the circuits, illustrated diagrammatically in Figures 22 and 23, upon pushing button 156, which is used at the beginning of each press operation to start all the mechanism and cause it to function until the end of a cycle. There is also the button 155 which is merely for starting the carriage motor 35 independently of the related press mechanism.

Upon pushing the button 156 all parts of the mechanism operate in sequence to perform the various operations outlined, assisted by a cam motor 179 and associated mechanism in a box 181, which will now be described.

*Cam mechanism for press*

Figure 10:
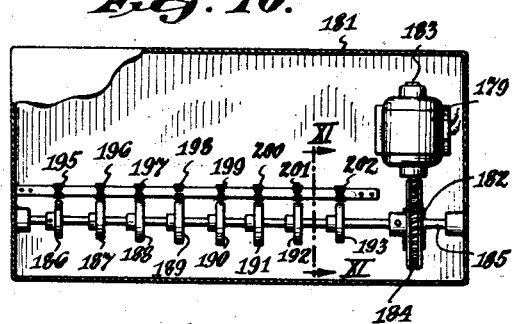
Figure 10 is an elevational view of the mechanism inside of the cam box beneath the loading hopper.
Figure 11:
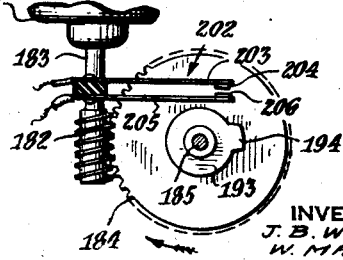
Figure 11 is a vertical sectional view on the line XI—XI of Figure 10, in the direction of the arrows.

The cam motor 179 and associated apparatus is illustrated most clearly in Figures 10 and 11, the position of the cam box 181 being shown in Figure 1. The cam motor has a worm 182 on its armature shaft 183, which worm meshes with a wheel 184 mounted on a shaft 185 journaled in said box 181 and carrying eight cams, 186, 187, 188, 189, 190, 191, 192 and 193, formed generally as shown in Figure 11, but with the operating projections 194 definitely disposed and of the desired circumferential lengths, so that the correspondingly associated spring contact switches 195, 196, 197, 198, 199, 200, 201, 202 are operated at the desired times.

Each switch is constructed generally as shown in Figure 11 and desirably comprises an upper or fixed spring bronze strip 203 carrying a tungsten contact 204. The cooperating or cam-engageable element, desirably also comprises a spring bronze strip 205 carrying a tungsten contact 206. The respective cams are rotatable clockwise, as indicated by the arrow. Each switch may be either normally open or normally closed, and closed or opened, as the case may be, upon the cam projection 194 causing engagement, or separating therefrom to permit disengagement.

Automatic operating cycle

Before the cycle of operations is started, the upper and lower mold blocks 80 and 161 are heated by steam, admitted through the pipes 170 and 162, to the proper molding temperature, and the main switch 213 (Fig. 22) is closed, as well as the knife switch 214 and the snap switch 215 (Fig. 23). This energizes the power lines 216, 217, and 218, which in the present instance are those of a three-wire 110–220-volt alternating-current system and the 110 volt alternating-current power lines 251 and 272.

The green signal lamp 273 is always energized, when the knife switch 214 is closed, by circuit from power line 272 through lines 274 and 275, lamp 273, lines 276, 277 and 278, to power line 251. This green lamp is, therefore, merely an indication that the power is on. Red lamps 279 and 281, however, are now also energized to show that the upper mold element or head is in open or tilted position. The circuit to these lamps is from power line 272 through lines 274 and 275, red lamp 279, lines 282 and 283, mercury switch 284, which is in the closed position shown in full lines, when the head 99 is tilted as shown in Figure 4, lines 285 and 253, snap switch 215, and line 252, to power line 251. The red lamp 281 operates in parallel with the red lamp 279, from line 283 through line 286 and from power line 272 through line 271, snap switch 215, and lines 269 and 287.

The automatic operating cycle starts when the push button 156 (Fig. 22) is depressed or closed, at which time it is assumed that the press is open as shown in Figure 4, and that the loading board 56 underlies the hopper 32 and contains a charge of moldable pellets 31.

Depressing the button 156 closes a circuit from power line 216 through conductors or lines 219, 221 and 222, switch 156, lines 223, 224, and 225, relay coil or solenoid 226 (to close line starter 227), and lines 228 and 229 to power line 218.

Closing the line starter 227, initiates a circuit, independent of the opening of the switch 156, from power line 216 through lines 219, 221, and 231, left hand contact of line starter 227, line 232, normally closed cam-operated switch member 233, lines 224 and 225, solenoid 226, and lines 228 and 229 to power line 218. This, of course, means that only instantaneous closing of the switch 156 is necessary in order to initiate the cycle of operations.

Closing of the line starter 227 also initiates a circuit from power line 216 through lines 219, 221 and 234, normally closed cam-operated switch element 235, line 236, normally closed stop button or switch 237, lines 238 and 239, right hand contact of line starter 227, line 241, cam-operated switch 202 (closed only at the beginning of the cycle), lines 242 and 243, and relay coil or solenoid 244 of line starter 245 (for carriage motor 35) to power line 217. The inclusion of the switch 202 in the circuit insures a correct initial positioning of the cam shaft 185, as otherwise the carriage motor will not start. Closing of the line starter 245 not only starts the carriage motor 35, but causes closing of the hold-in switch 246 which short-circuits the line through switch 202. The press is now loaded and the loading board 56 returns for refilling.

After the return of the loading board 56 to position beneath the loading hopper 32, and the charging of said loading board with a new batch of pellets 31, the cam 248 (Fig. 1) on the operating shaft 37 momentarily closes the normally open switch 249, to start the closing operation of the loaded molding press. The cam 247 on the same shaft, simultaneously or just after starting the molding press, momentarily opens the normally closed switch elements 233 and 235, to stop the carriage motor 35 and return its operating circuits to initial positions.

The closing of switch 249 initiates a circuit from power line 251 (Fig. 23) through line 252, snap switch 215, lines 253, 298 and 254, switch 249, lines 255, 256 and 257, mercury switch 258 on one of the side plates 100 of tilting head 99 (which is closed because of the tilted or rearward position of said head), lines 259, 261, 262, 263, and 264, relay coil or solenoid 265 of line starter 266, lines 267, 268 and 269, snap switch 215, and line 271 to power line 272. The starting button 250, in parallel with the switch 249, may be used if it is desired to operate the press independently of the loading mechanism. The stop button 260 is used like the stop switch J of the Makenny et al. Patent No. 2,197,528, previously referred to, to cause the press to open, as in case of emergency.

Closing of the line starter 266 initiates a circuit from power line 272 through lines 274 and 289, solenoid 291 of timing clock 109, to reset the clock for a predetermined timing period, as by releasing and allowing its pointer or hand 292 to move, as by spring pressure, from the zero position shown in full lines to the set position shown in dotted lines, thereby preparing it to time the molding operation. The circuit continues from solenoid 291 through lines 293, 294, 295, 296 and 297, through the left hand contact of line starter 266, lines 298, 253, snap switch 215, and line 252 to power line 251.

Simultaneously with this resetting action, the head or upper mold element 99 starts to move forward from the position shown in Figure 4, on the admission of air from compressed air supply line 290 to the pipe 106 by energization of the solenoid 299 moving the air valve operating handle 301 to the right from the position shown in Figure 23. The operating circuit for effecting this movement is from power line 251, through line 252, snap switch 215, lines 253 and 298, right hand contact of line starter 266, lines 302 and 303, solenoid 299, lines 304, 305, 306 and 269, snap switch 215, line 271 to power line 272.

When the head 99 has been moved to the vertical position, or directly above the lower mold elements 47, the red lamps 279 and 281 are de-energized, the lower mold elements start to rise, and the clock simultaneously starts timing the molding operation. The clock timing period is so adjusted that it makes allowance for the time the mold elements 47 take to actually rise into engagement with the head 99 or mold elements therein, so that the moldable material is kept pressed, subject to the steam heating operation, for a predetermined desirable length of time.

The circuits for effecting these operations are from power line 251, through line 252, snap switch 215, lines 253 and 285, to switch 307 (closed momentarily by the clockwise tilting of the switch lever 308, pivoted to stationary supporting frame 309 as indicated at 310), line 315, mercury switch 316 (which closes as the upper mold element reaches its forward position), lines 317 and 318, solenoid 319, lines 321, 305, 306 and 269, snap switch 215, and line 271 to power line 272.

The lever 308 is tilted, to the dotted position shown in Figure 23, by the engagement of arm 311 therewith (which arm is carried by crank 110 on one of the trunnions 120), as the head 99 reaches the forward or vertical position, as shown in Figure 1. The tilting of said lever 308 to the dotted position also opens mercury switch 284 (de-energizing the red lamps 279 and 281) and closes mercury switch 325, both carried thereby. The lever 308 carries a tip member 312 pivoted at 313, so that it causes closure of the switch 307 only when swinging clockwise, or moving from right to left, as viewed in Figure 23. The tip member 312 swings clockwise or to the left (so as to be out of the way without performing any function), when the lever 308 moves back from dotted to full line position. The arm 311 actuates the lever 308 by engagement with a crank arm 314 extending from the latter.

Energization of the solenoid 319 pulls the water valve operating handle 322 to the right, as viewed in Figure 23, to cause water to flow from supply line 323 through the valve and line 177 to the cylinder 173 (Fig. 21) under the piston 174 to lift the lower mold elements 47 into engagement with the upper mold or head 99, closing the mold against the lesser force of water pressure on the pistons 169 in cylinders 171, supplied through branch pipe 178, which in this case act as cushioning means.

Timing movement of the clock is effected by energization of the clock motor 327 from power line 272 through line 271, snap switch 215, line 324, mercury switch 325 (now closed by the carrying lever 308 being in its dotted position), line 326, clock motor 327, and lines 328 and 278 to power line 251.

When the timing pointer 292 reaches its initial or zero position, shown in full lines in Figure 23, at the end of the predetermined timing period, it closes a circuit through contact 334 which energizes the counter 331 and adds one to the number recorded thereon. The circuit for this purpose is from power line 272 through line 271, snap switch 215, line 324, mercury switch 325, lines 326 and 332, counter 331, line 333, pointer 292, contact 334, and lines 328 and 278 to power line 251. This counter records the fact that a load of pressed members 125 has been finished in the machine.

At the same time that the counter is energized the lower mold element is started on its return travel to initial position by energization of the solenoid 335 to return the water valve operating handle 322 to initial position, thereby exhausting the water from the cylinder 173 through pipe 177 to pipe 346, while still maintaining the water pressure in cylinders 171. The energization of the solenoid 335 is effected only after the circuit through clock pointer 292 is completed to energize the relay coil or solenoid 336 of line starter 340. The circuit for effecting this energization is from power line 272 through line 271, snap switch 215, lines 269 and 306, solenoid 336, lines 337, 338, 339 and 333, pointer 292, contact 334, and lines 328 and 278 to power line 251. Closing of the line starter 340, completes the circuit from power line 272 through line 271, snap switch 215, line 324, mercury switch 325, lines 326, 341 and 342, solenoid 335, line 343, line starter 340, lines 344, 345, 298 and 253, snap switch 215, and line 252 to power line 251.

When the piston 174 reaches its lowermost position, under the action of the return pistons 169 operating in cylinders 171, the mercury switch 347 on the base of the machine is momentarily tripped or moved to the horizontal closing position, shown in Figure 3, by the actuating member 348 carried by one of the cross members 168. The member 348 has a pivoted tip portion 349 which engages the left end 350 of the switch carrier pivoted at 360 and actually moves the switch 347. The tip portion 349 swings downwardly out of the way upon the upward return movement of the lower mold elements, so that the switch 347 is only closed once upon each motion cycle of said lower elements.

Closing of the switch 347 completes a circuit from power line 272 through line 271, snap switch 215, lines 269, 306 and 305, solenoid 351, lines 352, 353, 354 and 355, mercury switch 347, lines 356, 344, 345, 298 and 253, snap switch 215, and line 252 to power line 251. Energization of the solenoid 351 returns the air valve operating handle 301 to the initial position illustrated in Figure 23, admitting air to pipe line 198 from supply line 290, and exhausting it from pipe line 106, to move the head 99, including the upper mold elements 98, to initial tilted position as shown in Figure 4.

As the head returns to said tilted position, the red lamps 279 and 281 are re-energized by the release of the crank arm 314 allowing the mercury switch 284 to close. At the same time the lever 357, carried on one of the side plates 100 swings back (toward the right hand position illustrated in Figures 5 and 23) and engages the arm 358 of bell crank lever 359 pivoted at 361 on a base portion of the machine, and tilts the mercury switch 362 carried on a depending arm 363 thereof to closed position, against the action of return spring 364, thereby energizing the relay coil or solenoid 365 of line starter 366 for the control or cam motor 179 (Fig. 22).

Energization of this actuating solenoid is effected from power line 216, through lines 219 and 367, mercury switch 362 (Fig. 23), line 368 (Fig. 22), lines 369 and 371, normally closed switch 372 in time delay relay 373, line 374, relay coil or solenoid 365 of line starter 366, and lines 375 and 229 to power line 218. Actuation of the solenoid 365 closes the line starter contacts and energizes the relay coil or solenoid 377 in the time delay relay 373 to cause a closure of the switch 378 therein at the end of the predetermined time interval, and then the opening of the switch 372.

A holding circuit for the line starter solenoid 365 is established (so that opening of the mercury switch 362 does not open line starter 366) from power line 216, through lines 219, 367, 379, middle contact of starter 366, lines 368, 369, 371, switch 372, line 374, solenoid 365, and lines 375 and 229 to power line 218. The circuit for energizing the solenoid 377 is from power line 216 through lines 219, 367 and 379, left contact of line starter 366, lines 381 and 382, time delay solenoid 377, lines 383 and 384, right contact of line starter 366, and lines 375 and 229 to power line 218.

Closing of the time delay relay switch 378, at the end of the predetermined interval, energizes control or cam motor 179 from power line 216 through lines 219, 221 and 385, switch 378, line 386, motor 179, and line 229 to power line 218.

Turning of the shaft 185 (Figs. 10 and 11) by the motor 179 first causes closing of switch 195 by means of cam 186, thereby establishing a holding motor circuit from power line 216 (Fig. 22) through lines 219, 367, 387 and 388, switch 195, line 389, motor 179, and line 229 to power line 218. This keeps the motor 179 running even after opening of the switch 312, which opens the starter 366, causing opening of the switch 378 and breaking the motor starting circuit, upon a return of the time delay relay to initial position. The cam 186 is so formed that it keeps the switch 195 closed and the motor 179 running until all the other cams of the series on the shaft 185 have performed their functions in a manner which will now be explained.

Further turning of the shaft 185 causes closing of the switch 196 by its cam 187, thereby effecting energization of the solenoid 391 to move the air valve handle 392, from the position shown in Figure 22, to admit compressed air from the line 290 to the cylinder 112 (Fig. 21) above the piston 111 through pipe 393, and raise the name plates 50, lifting the molded members 125 from the lower mold elements 47 to the position shown in Figures 17 and 18.

The circuit for effecting this operation is from power line 216, through lines 219, 367, 387, 388, switch 196, lines 394 and 395, solenoid 391, and lines 396, 397, 228 and 229 to power line 218. As previously explained, a raising of the name plates also effects movement of the stripper fork 124 to a position beneath the molded articles 125; that is, from the position shown in Figures 17 and 18 to that shown in Figures 19 and 20.

Further turning of the shaft 185 opens the switch 196 and closes the switch 197 by cam 188, thereby exhausting air from the pipe 393 and admitting it to the pipe 399 to lower the name plates 50, leaving the stripper fork advanced and supporting the molded articles 125, by energizing the solenoid 401 to return the air valve handle 392 to the position shown in Figure 22. The circuit for accomplishing this is from power line 216 through lines 219, 367, 387, 388, switch 197, lines 402 and 403, solenoid 401, lines 396, 397, 228 and 229, to power line 218. When this is accomplished, the molded articles rest on the stripper fork as shown in Figures 19 and 20.

Further movement of the shaft 185 effects closure of the switch 200 by its cam 191, thereby energizing the solenoid 404 to turn air valve handle 405 and admit compressed air to stationary blower pipe 134, before the name plates have reached their lowest position, to move the shells, or other molded articles 125, to and along the discharge chute 163 and on into the receptacle 164. The actuating circuit is from power line 216, through lines 219, 367, 387, 388, switch 200, lines 410 and 413, solenoid 404, and lines 397, 228 and 229, to power line 218.

In order to insure that all particles, as well as the actual molded articles, are removed from the molds by compressed air, the swing motor 142 is energized, upon closing of the switch 201, and compressed air admitted to the swinging blower pipes 135 and the stripper fork is retracted. The name plates are then again raised while the air continues to blow from the stationary blower pipe 134.

Energization of the swing motor 142 is effected from power line 216 through lines 219, 367, 387, switch 201, lines 406 and 414, swing motor 142, and lines 397, 228 and 229 to power line 218. At the same time energization of the solenoid 408 is effected, in parallel with the swing motor 142, through lines 409 and 396 from lines 414 and 397, respectively, to move the air valve handle 411 and admit compressed air through pipe 151 to swinging pipes 135 and cylinder 132 (Figs. 3, 21 and 22). This effects a thorough cleaning of the then opened mold elements by removing all the fine particles of "flash" and the like and a withdrawal of the stripper fork 124.

Further movement of the shaft 185 causes closure of the switch 198 by the respective cam 189, while still keeping the switch 200 closed. Closing of the switch 198 effects raising of the name plates 50 once more (and inward movement of the stripper fork 124 against the air pressure in cylinder 132), in exactly the same manner as closing of the switch 196 previously described, except that the circuit is through switch 198 with the line 394 not used.

Further turning of the shaft 185 opens the switch 198 and effects closure of the switch 199 by means of its cam 190. This re-energizes the solenoid 401 and again lowers the name plates, in a manner exactly as previously described in connection with the closing of the switch 197, except that the circuit is now through the additional line 412. The stripper fork 124 is withdrawn by the action of compressed air in its cylinder 132. The switches 200 and 201 then open allowing the air valve handles 405 and 411 to be closed by their return springs 418 and 419. Finally the switch 202 is closed by action of its cam 193, and the switch 195 is opened stopping the cam motor and putting the mechanism in position to be again started for a new cycle of operations by merely pushing the button 156.

If for any reason it is desired to open the mold prior to the end of the normal molding operation, the stop button 260 is depressed, initiating a circuit from power line 272 through line 271, snap switch 215, line 324, mercury switch 325, lines 326, 341, 342, solenoid 345, lines 415, 416 and 417, stop switch 260, lines 298 and 233, snap switch 215, and line 252 to power line 251. This energization of the solenoid, starts the cycle of operations, beginning with the lowering of the bottom mold elements, which results in an automatic complete opening of the press, in accordance with the previous description.

Figure 2:
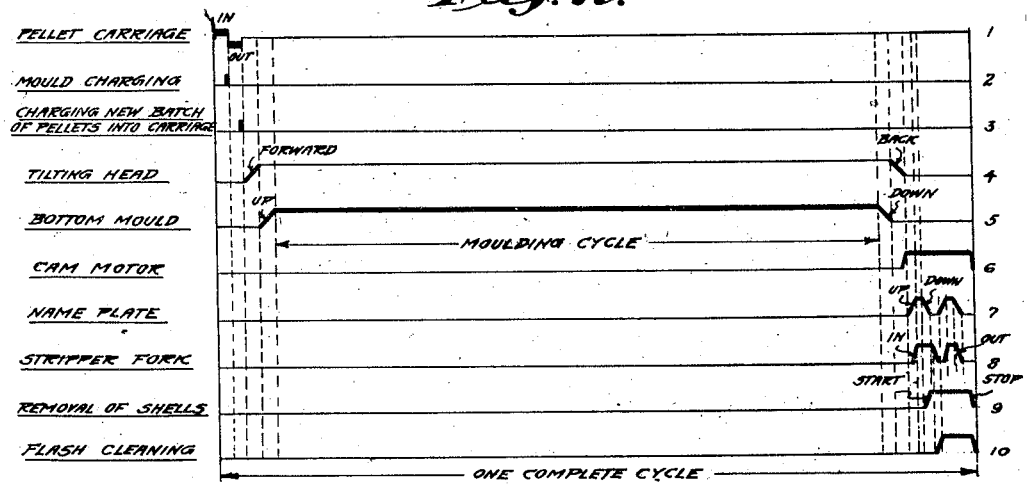
Figure 2 is a diagram showing the sequence of one cycle of events which take place during operation of a machine such as shown in Figure 1.

*Outline of operations with reference to Figure 2*

In order to start the automatic molding cycle, (assuming the press is open and the loading board 56 is under the loading hopper 32 and contains a load of pellets 31), steam is admitted to the upper and lower mold blocks 80 and 161 through the pipes 170 and 162 to heat them to the desired molding temperature, and the switches 213, 214 and 215 are closed, energizing the green lamp 273 and the red lamps 279 and 281. The green lamp indicates that the power is on and the red lamps (which may be positioned at desired locations), that the press is open.

The starting switch or button 156 may now be depressed, closing the line starter 227 to initiate a circuit shunting the starting button line circuit, and making it unnecessary for operation to keep the starting button depressed.

The line starter 245 then closes, as well as the associated switch 246, which starts the carriage motor 35, and maintains the operation thereof for the required period of time.

This situation is represented in Figure 2 by the upper line, or that after "pellet carriage," showing that said carriage first moves in to load the mold and then out after the mold has been charged, as indicated by the second line, or that after "mold charging." After return, a new batch of pellets is placed in the carriage, as shown by the third line, or that marked "charging new batch of pellets into carriage."

After the press has been loaded and the board 56 returned for recharging, switch 249 is momentarily closed by the cam 248 to close the line starter 266 for operation of the press 48, and the switches 233 and 235 momentarily opened to stop the carriage motor and return the operating circuits therefor to initial positions.

Closing of the line starter 266, effects resetting of the timing clock 109 to fix the duration of the molding operation, and starts the forward swinging movement of the head and upper mold elements. When the head reaches a vertical position, or one directly above the lower mold elements, the red lamps 279 and 281 are put out to indicate that said head has moved forward. This operation is indicated on the fourth line of Figure 2, or that after "tilting head" showing that it moves forward before the bottom mold elements move up, which latter operation now starts as indicated on the fifth line, or that after "bottom mold."

As the bottom mold elements rise to close the mold, the clock 109 starts the timing operation. This means that the mold is held closed, in the absence of an emergency use of the stop button 260, until the moldable material has been compressed in the steam heated mold for the desired length of time.

At the end of the timing cycle, a circuit is initiated by the clock 109, through its contact 334, which energizes the counter 331, and the lower mold element, then moves to open position or down, as indicated on said fifth line of Figure 2, followed by a backward or tilting movement of the head, as indicated on the fourth line of said figure.

As the tilting head or upper mold elements move to open or rearward position, the red lamps 279 and 281 are re-energized and a momentary closing of the switch 362 results to operate the line starter 366 for the time delay relay 373. This time-delay relay effects operation of the cam motor 179, beginning at about the end of the rearward movement of the tilting head, as shown on the sixth line of Figure 2, or that after "cam motor."

Operation of the cam motor 179 causes closing of the switch 195 to provide a holding circuit to keep it going. Further movement of the motor closes switch 196 to cause the name plates 50 to rise, as indicated on the seventh line of Figure 2, or after "name plate," and the stripper fork to move in, as indicated on the eighth line of Figure 2, or after "stripper fork."

Further movement of the cam motor causes closing of the switch 197 which starts lowering the name plates, leaving the stripper fork under the molded articles, and then closing of the switch 200 to start blowing the shells from the supporting stripper fork, as indicated on the ninth line of Fig. 2, or after "removal of shells."

Upon further movement, the cam motor causes closing of the switch 201 and "flash" cleaning, as indicated on the tenth line of Fig. 2, or after "flash cleaning," by energization of the swing motor 142 and admitting air to the swinging blower pipes 135 and cylinder 132 to retract the stripper fork.

The next operation is the closure of the switch 198 (without opening the switch 200), to raise the name plates 50 once more and move the stripper fork inward again (this time against the pressure of air in cylinder 132).

Further movement of the cam motor causes opening of the switch 198 and closing of the switch 199, again lowering the name plates and allowing the stripper fork to be withdrawn by compressed air in the cylinder 132.

The switches 200 and 201 then open allowing the air to be shut off, the switch 202 closes, and the switch 195 opens stopping the cam motor and returning the mechanism to initial position, ready for restarting by button 156.

Summarizing the foregoing operations, we have the following sequence:

1. Admit steam to upper and lower mold blocks 80 and 161 and open hydraulic and air line valves.
2. Close switches 213, 214 and 215 to energize green and red lamps and apply power to operating lines.
3. Push starting button 156.
4. Line starter 227 closes.
5. Starting button circuit shunted.
6. Line starter 245 and associated switch 246 closes, starting carriage motor 35 to cause the press to be loaded with preferably generally spherical pellets of moldable material and the loading board returned for recharging.
7. Switch 249 momentarily closed to operate line starter 266 for the press 48.
8. Switches 233 and 235 momentarily opened to stop carriage motor 35.
9. Timing clock 109 reset.
10. Upper mold elements move forward.
11. Red lamps de-energized.
12. Lower mold elements move up.
13. Clock 109 starts the timing operation.
14. Moldable material compressed for the desired length of time.
15. Counter energized.
16. Lower mold elements move down.
17. Head tilts backward to open position.
18. Red lamps re-energized.
19. Cam motor 179 started through time-delay relay.
20. Switch 195 closes to provide motor holding circuit.
21. Name plates rise and stripper fork moves in.
22. Name plates descend leaving stripper fork under molded articles.
23. Molded articles blown from supporting stripper fork.
24. Mold elements cleaned of "flash" by compressed air.
25. Stripper fork retracted.
26. Name plates raised and stripper fork again advanced, this time against air pressure, and with air blowing against these parts to remove the "flash."
27. Name plates lowered and stripper fork withdrawn.
28. Blower air shut off.
29. Switch 202 closes to put circuits in condition for restarting.
30. Switch 195 opens stopping cam motor and returning mechanism to initial position.

In view of the foregoing, it will be seen that we have provided mechanism for taking pellets of moldable material from a hopper, feeding them to a molding machine, and automatically removing them from said machine when finished, without any intermediate handling or attention on the part of the operator.

It will also be seen that we have provided interlocks for preventing the mold from closing when damage might ensue if such an operation occurred, signal lights for showing when the power is on and when the mold is open, as well as means for operating the feeding mechanism independently of the molding mechanism, and the molding mechanism independently of the feeding mechanism.

It will be understood that although our invention is shown embodied in a certain type of press, yet the loader will also work with vertically opening presses, as well as tilting head presses. The loader, although shown separate from the molding press itself, may, if desired, be consolidated therewith. If separate, however, immediate removal thereof is permitted for the purpose of manually operating the press, if at any time desired.

If it is desired to cause the press to work entirely automatically, that is, continue in production with one cycle immediately following a prior cycle, after once being started and without attention from the operator, this may be accomplished by causing the starting button 156 to stay depressed, or permanently connect the lines 222 and 223, as shown in Figure 22.

If desired the tablet hopper may be wired or otherwise provided with means to preheat the pellets and thus speed up the curing cycle. It may be served from a belt or other conveyor to keep it filled with pellets and thus eliminate the necessity for manual loading thereof. It will also be understood that the mold blocks may be heated by other means than steam, such as electricity for example.

The molded members or shells are, as described, blown off the mold, after stripping, through a chute, such as 163, into a receptacle, such as 164, thereby delivering them where desired and preventing them from getting on the floor.

Although we have shown pellets or tablets for feeding the molds, it will be understood that, if desired, the moldable material may be fed thereto in powdered form.

Although a preferred embodiment of our invention has been disclosed, it will be understood that modifications may be made within the spirit and scope of the appended claims.

We claim:

1. Apparatus for molding plastic material comprising a hopper for distributing pellets thereof, a loading carriage comprising upper and lower plates, said upper plate having a plurality of apertures to receive said pellets, said lower plate being similarly apertured, so that in one relative position it supports and in another it releases pellets in said upper plate apertures, means in said hopper for automatically delivering pellets simultaneously to all apertures of the upper plate when the lower plate is in supporting position, a molding press formed with upper and lower mold elements, corresponding in number and arrangement with the pellet-holding apertures of said upper plate, means for automatically moving said carriage from beneath said hopper to above said lower mold elements and depositing said pellets simultaneously in all of said elements, means to bring the mold elements together to compress said pellets and then separate said elements after a predetermined time interval, and means to automatically remove the molded articles from said lower mold elements.

2. Apparatus for automatically molding plastic material comprising an upper mold block and a lower mold frame, a plurality of upper mold elements in said block, a corresponding number of lower mold elements in said frame, means mounting said upper mold block so that it is capable of being swung forwardly over and rearwardly from the lower mold elements, means mounting said lower mold frame so that it is capable of being moved up to and down from the upper mold elements when in their forward position, electrical mechanism for automatically controlling said apparatus, manually operable means for energizing said electrical mechanism to start automatic operation of the apparatus, mechanism operable under the control of said electrical mechanism for delivering plastic pellets simultaneously to all of said lower mold elements, means for swinging the upper mold elements forward over the lower mold elements and after a predetermined time period returning them to normal position, means for moving the lower mold elements up to compress said pellets against the upper mold elements when the latter are in forward position and after a predetermined time interval moving down to normal position, means in each of said lower mold elements which engages the lower surface of each article, means to raise said article-engaging means, lift all of said articles, and then lower said means, article-supporting means, means to move said supporting means under all of said lifted articles to support the same after the article-engaging means descend to normal position, and means for delivering a blast of air to remove said articles from said supporting means.

3. Apparatus for automatically molding plastic material comprising an upper mold block and a lower mold frame, a plurality of upper mold elements in said block, and a corresponding number of lower mold elements in said frame, means mounting said upper mold block so that it is capable of being swung forwardly over and rearwardly from the lower mold elements, means mounting said lower mold frame so that it is capable of being moved up to and down from the upper mold elements when in their forward position, electrical mechanism for automatically controlling said apparatus, manually operable means for energizing said electrical mechanism to start automatic operation of the apparatus, mechanism operable under the control of said electrical mechanism for delivering plastic pellets simultaneously to all of said lower mold elements, means for swinging the upper mold elements forward over the lower mold elements and after a predetermined time period returning them to normal position, a clock to time said period, means for moving the lower mold elements up to compress said pellets against the upper mold elements when the latter are in forward position, and after said time period down to normal position, a name plate in each of said lower mold elements which engages the lower surface of each article after molding, means to raise said name plates, lift all of said articles, and then lower said plates, stripper forks, means to move said forks under all of said lifted articles to support the same after the name plates descend to normal position, means for delivering a blast of air to remove said articles from said stripper forks, and means to deliver another blast of air to clean the mold elements and put them in condition for receiving another charge of pellets.

4. Apparatus for automatically molding plastic material comprising an upper mold block and a lower mold frame, a plurality of upper mold elements in said block, a corresponding number of lower mold elements in said frame, means mounting said upper mold block so that it is capable of being moved between open and molding positions, electrical mechanism for automatically controlling said apparatus, manually operable means for energizing said electrical mechanism to start automatic operation of the apparatus, mechanism operable under the control of said electrical mechanism for delivering plastic pellets simultaneously to all of said lower mold elements, means for moving the upper mold elements to molding position and after a predetermined time period returning them to open position, means in each of said lower mold elements which engage the lower surface of articles being molded, means to raise said article-engaging means, lift all of said articles, and then lower said means, article-supporting means, means to move said supporting means under all of said lifted articles to support the same after the article-engaging means descend to normal position, and means for delivering a blast of air to remove said articles from said supporting means.

5. Apparatus for automatically molding plastic material comprising an upper mold block and a lower mold frame, a plurality of upper mold elements in said block, and a corresponding number of lower mold elements in said frame, means mounting said upper mold block so that it is capable of being moved between open and molding positions, electrical mechanism for automatically controlling said apparatus, manually operable means for energizing said electrical mechanism to start automatic operation of the apparatus, mechanism operable under the control of said electrical mechanism for delivering plastic pellets simultaneously to all of said lower mold elements, means for moving the upper mold elements to molding position and after a predetermined time period returning them to open position, a clock to time said period, means in each of said lower mold elements which engage the lower surfaces of articles being molded, means to raise said article-engaging means, lift all of said articles, and then lower said means, stripper forks, means to move said forks under all of said lifted articles to support the same after the article-engaging means descend to normal position, means for delivering a blast of air to remove said articles from said stripper forks, and means to deliver another blast of air to clean the mold elements and put them in condition for receiving another charge of pellets.

6. Apparatus for molding plastic material comprising a molding press having an upper mold block and a lower mold frame, a plurality of upper mold elements in said frame, means in each of said lower mold elements which are engaged by the lower surfaces of the articles being molded, means for opening and closing said press, a carriage comprising upper and lower plates, said upper plate being apertured to receive said material, said lower plate being similarly apertured so that in one position relative to said upper plate it supports, and in another position it releases, material in said upper plate apertures, means for loading said carriage with said material when said plates are in supporting relation, means for moving said carriage from beneath said loading means to above the lower mold elements, electrical operating and control means for said press and carriage for loading said carriage with said material, moving it from beneath said loading means to above the lower mold elements, adjusting the carriage to the release position of its plates to deposit its load simultaneously in all of said lower mold elements, and moving it back for reloading, means to raise said article-engaged means after the material has been molded, lift all of the formed articles, and then lower said means, article-supporting means, means to move said supporting means under all of said lifted articles to hold the same after the article-engaged means descend to normal position, and means for delivering a blast of air to remove said articles from said supporting means.

7. Apparatus for molding plastic material comprising a hopper, means in said hopper for arranging a plurality of pellets for simultaneous discharge therefrom, a loading board with a plurality of pellet-holding portions corresponding in number and arrangement with said arranged hopper pellets, means for operating said hopper to automatically deliver all of said arranged pellets so that one lies in each holding portion of said board, a molding press formed with upper and lower mold elements, corresponding in number and arrangement with the pellet-holding portions of said board, means in each of said lower mold elements which are engaged by the lower surfaces of the articles being formed, means for automatically moving said board from beneath said hopper to above said lower mold elements and depositing said pellets simultaneously in all of said lower mold elements, means to bring the mold elements together to compress said pellets and then separate said elements after a predetermined time interval, means to raise said article-engaged means to lift all of the formed articles, and then lower said means, article-supporting means, means to move said supporting means under all of said lifted articles to hold the same after the article-engaged means descend to normal position, and means for delivering a blast of air to remove said articles from said supporting means.

8. Apparatus for molding plastic material comprising a hopper for distributing pellets thereof, a loading carriage comprising upper and lower plates, said upper plate having a plurality of apertures to receive said pellets, said lower plate being similarly apertured, so that in one relative position it supports and in another it releases pellets in said upper plate apertures, means for operating said hopper to automatically deliver pellets simultaneously in all apertures of the upper plate when the lower plate is in supporting position, a molding press formed with upper and lower mold elements corresponding in number and arrangement with the pellet-holding apertures of said upper plate, means in each of said lower mold elements which are engaged by the articles being formed, means for automatically moving said carriage from beneath said hopper to above said lower mold elements and depositing said pellets simultaneously in all of said lower mold elements, means to bring said mold elements together to compress said pellets and then separate said elements after a predetermined time interval, means to automatically lift said molded articles from said lower mold elements by raising said article-engaged means, means to then lower said means, article-supporting means, means to move said supporting means under all of said lifted articles to hold the same after the article-engaged means descend to normal position, and means for delivering a blast of air to remove said articles from said supporting means.

JAMES B. WHITMORE.
WILLIAM MAKENNY.
FRANK A. NEWCOMBE.